United States Patent [19]

Gochi

[11] Patent Number: 5,778,195
[45] Date of Patent: Jul. 7, 1998

[54] PC CARD

[75] Inventor: Hidenobu Gochi, Itami, Japan

[73] Assignee: Mitsubishi Denki Kabushiki Kaisha, Tokyo, Japan

[21] Appl. No.: 560,986

[22] Filed: Nov. 20, 1995

[30] Foreign Application Priority Data

Jun. 26, 1995 [JP] Japan ................................. 7-159240

[51] Int. Cl.$^6$ ....................................... G06F 13/00
[52] U.S. Cl. ............................................ 395/282; 395/311
[58] Field of Search ............................. 395/282, 311; 361/737

[56] References Cited

U.S. PATENT DOCUMENTS

| | | | |
|---|---|---|---|
| 5,420,412 | 5/1995 | Kowalski | 395/275 |
| 5,451,933 | 9/1995 | Stricklin et al. | 361/737 |
| 5,617,449 | 4/1997 | Tanaka | 375/222 |
| 5,619,396 | 4/1997 | Gee et al. | 361/737 |

FOREIGN PATENT DOCUMENTS 9514965  6/1995  WIPO .

*Primary Examiner*—Ayaz R. Sheikh
*Assistant Examiner*—David A. Wiley

[57] ABSTRACT

A PC card including a PCMCIA interference connected to external system equipment, a communication control section for communication through an external line, and a memory control section connected to a memory device. The PC card also includes an internal bus including a data bus, an address bus and a control signal bus connects a plurality of functions in the PC card, that is, the PCMCIA interface, the communication control section and the memory control section, to each other. By providing the control signal bus for various control signals, the PC card can be used in various modes. For example, in one mode, the PC card can be used in various modes. For example, in one mode, the PC card can be used as a communication card or a memory card. In another mode, data can be transferred through the internal bus between the communication control section and the memory control section. In yet another mode, the PC card can be used as a communication card and a memory card in a time-sharing manner. Further, a plurality of internal buses may be provided exclusively for various functions of the PC card.

13 Claims, 6 Drawing Sheets

PC CARD

BACKGROUND OF THE INVENTION

1. Field of the Invention

The present invention relates to a PC card.

2. Description of the Prior Art

A PC card includes a board on which electronic components such as an integrated circuit are mounted, and the PC card is inserted in a system equipment such as a personal computer. PC cards are provided for various uses. For example, PC cards having a memory function and a communication function are available.

However, a PC card having a memory function is a different entity from one having a communication function. When the two functions are both needed at the same time, two card slots for inserting the two cards must be provided in the system equipment. System equipment such as a handy terminal or a personal digital assistant has only one card slot. As a result, the cards need to be changed for each function in the system equipment.

SUMMARY OF THE INVENTION

An object of the present invention is to provide a PC card which can be used for various functions at the same time.

In one aspect of the invention, a PC card includes a PCMCIA interface connected to an external system equipment, a communication control section for communication through an external line, and a memory control section connected to a memory device. Further, an internal bus including a data bus, address bus and control bus connects a plurality of functions in the PC card, that is, the PCMCIA interface, the communication control section and the memory control section, to each other. Preferably, the internal bus includes a bus for transmitting a control signal for activating the communication control section or the memory control section from the PCMCIA interface. Then, the PC card is used as a communication card or a memory card. Preferably, the internal bus comprises a bus for transmitting a control signal for selecting the communication control section and the memory control section as a master. Then, data can be transferred between the communication control section and the memory control section. Preferably, the internal bus includes a bus for transmitting a control signal for communicating completion of communication processing with external equipment to the PCMCIA interface. Then, the memory control section can access the memory device while the communication control section communicates through the external line.

In a second aspect of the invention, a plurality of internal buses are provided for a plurality of functions in the PC card. That is, the PC card includes a PCMCIA interface including a memory control section and a communication control section controlling communication through an external line. A first internal bus includes a data bus, address bus and control signal bus, to connect the PCMCIA interface to the communication control section. On the other hand, a second internal bus includes a data bus, address bus and control signal bus to connect the memory control section in the PCMCIA interface to the memory device. Then, the memory device can be accessed at a high speed through the exclusive second internal bus. Preferably, the data bus in the second internal bus is wider than the data bus in the first internal bus.

An advantage of the present invention is that a PC card can be used for a plurality of functions.

Another advantage of the present invention is that a PC card can be used in a time-sharing manner for a plurality of functions.

BRIEF DESCRIPTION OF THE DRAWINGS

These and other objects and features of the present invention will become clear from the following description taken in conjunction with the preferred embodiments thereof with reference to the accompanying drawings, and in which.

DETAILED DESCRIPTION OF THE PREFERRED EMBODIMENTS

Figure 1:
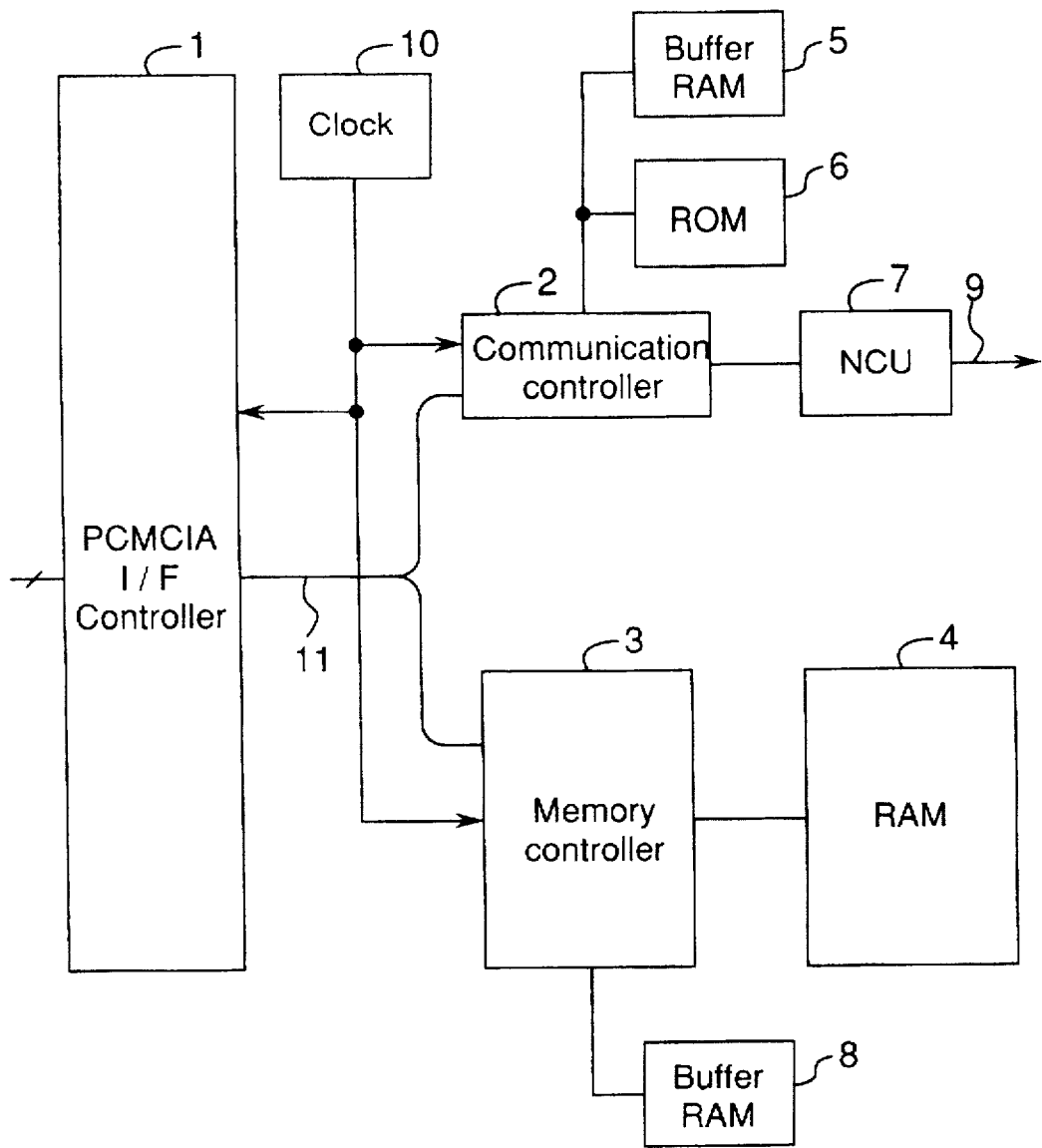
FIG. 1 is a block diagram of a PC card of a first embodiment of the present invention.

Referring now to the drawings, wherein like reference characters designate like or corresponding parts throughout the several views, FIG. 1 is a block diagram of a circuit in a PC card of a first embodiment of the present invention. In the PC card, a PCMCIA (Personal Computer Memory Card International Association) interface controller 1 includes an interface circuit having registers for input and output signals. The PCMCIA standards do not specify the internal structure of the PC card, rather only signal transmission with the PCMCIA interface controller 1. When the PC card is inserted in a system equipment such as a personal computer (not shown), the PC card transmits signals with the system equipment in the PCMCIA standards. For example, if the system equipment transmits signals to an electronic circuit in the PC card, it transmits signals through the PCMCIA interface controller 1.

In the PC card, the PCMCIA interface controller 1 includes a communication controller 2 controlling a communication function and a memory controller 3 controlling a memory function, both connected through a common internal bus 11 with each other. A clock generator 10 supplies clock signals to the PCMCIA interface controller 1, the communication controller 2 and the memory controller 3. The communication controller 2 is connected to a buffer RAM 5 and a ROM 6 storing firmware of the communication controller 2, and the PC card communicates with an external line 9 through a network control unit (NCU) 7. The memory controller 3 uses a buffer RAM 8 and controls reading from and writing to a memory device (RAM) 4.

Figure 2:
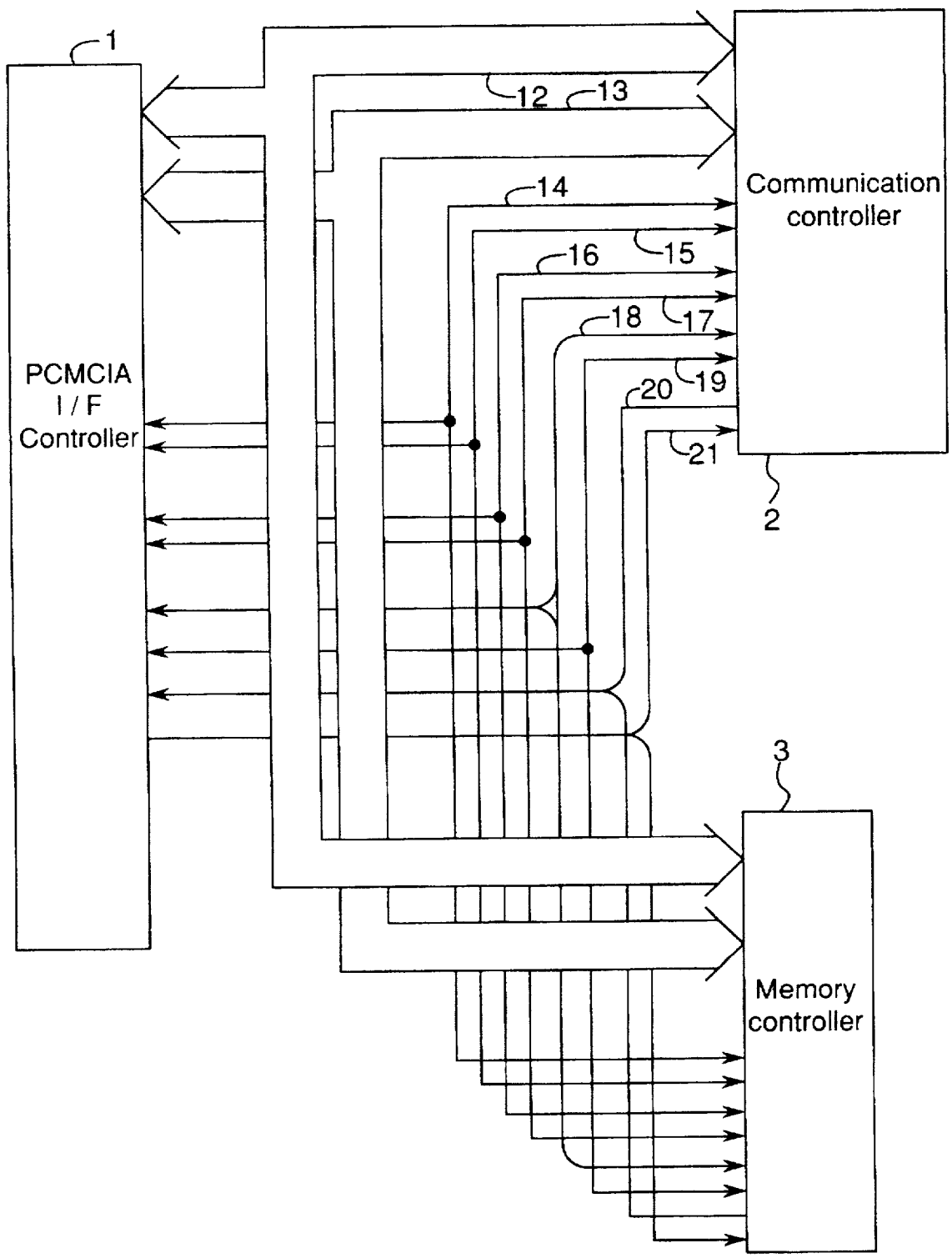
FIG. 2 is a diagram of an internal bus of the PC card.

FIG. 2 shows the internal bus 11 of the PC card in detail. The internal bus 11 includes various buses. An address bus 12 and a data bus 13 represent buses to transmit addresses and data. An I/O read bus 14 and an I/O write bus 15 represent busses to transmit an I/O read signal and an I/O write signal from the system equipment, the communication controller 2 or the memory controller 3. An output enable bus 16 and a write enable bus 17 represent buses to transmit an output enable signal and a write enable signal from the system equipment, the communication controller 2 or the memory controller 3. A device selection bus 18 represents a bus to transmit a device selection signal from the system equipment, the communication controller 2 or the memory controller 3. A ready/busy bus 19 represents a bus to transmit a ready/busy signal to indicate if the system equipment, the communication controller 2 or the memory controller 3 is ready or not. A request signal bus 20 represents a bus to transmit a request signal from the communication controller 2 or the memory controller 3. A request enabling signal bus 21 represents a bus to transmit a request enabling signal from the PCMCIA interface controller 1.

Figure 3:
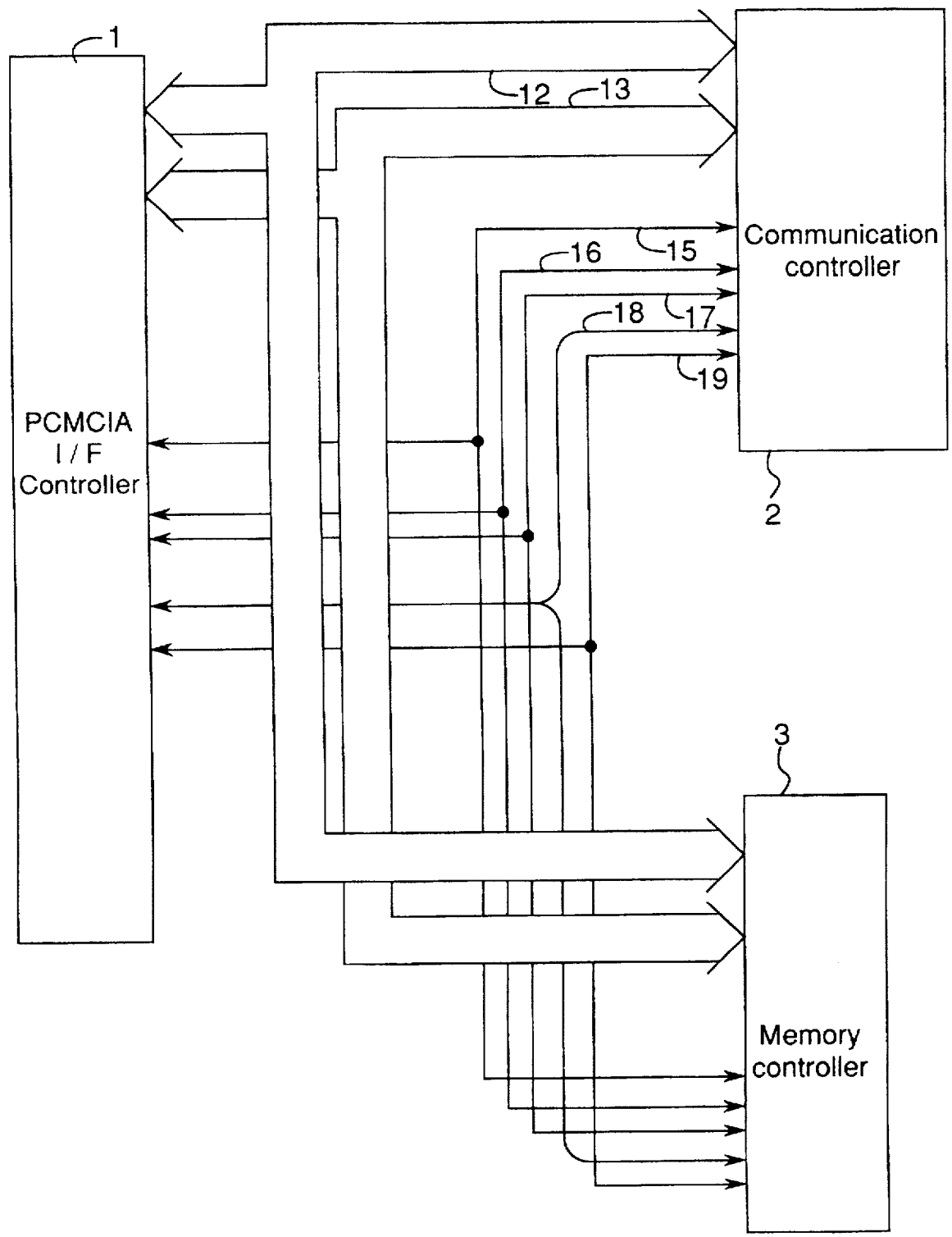
FIG. 3 is a diagram of the internal bus in an first mode of the PC card.

Next, three modes of operation of the abovementioned PC card are explained. The PC card has the communication function and the memory function. In the first mode of operation, the PC card is used as a communication card or a memory card. As shown in FIG. 3, the busses such as the address bus 12, the data bus 13, the I/O write bus 15, the output enable bus 16, the write enable bus 17, the device selection bus 18 and the ready/busy bus 19 are used in the internal bus 11 in this mode.

First, a situation is explained where the PC card is used as a communication card. When the PC card is inserted in a system equipment such as a personal computer, the system equipment transmits a request of communication to the PC card. Then, the PCMCIA interface controller 1 of the PC card changes the configuration to a communication card, and it activates the device selection signal bus 18 connected to the communication controller 2. That is, the PCMCIA interface controller 1 sends the device selection signal through the bus 18. Next, according to instructions from the system equipment, the PCMCIA interface controller 1 sets an address signal at the address bus 12 and a data signal at the data bus 13, and it activates the I/O write bus 15. Then, the communication controller 2 operates according to instructions to communicate through the external line 9.

Next, a situation is explained where the PC card is used as a memory card. When the PC card is inserted in the system equipment (not shown), the system equipment transmits a request of memory access to the PC card. Then, the PCMCIA interface controller 1 of the PC card changes the configuration to a memory card. Then, the system equipment activates the device selection signal bus 18 connected to the memory controller 3 through the PCMCIA interface controller 1. Next, according to instructions from the system equipment, the PCMCIA interface controller 1 sets an address signal at the address bus 12 and a data signal at the data bus 13, and it activates the output enable bus 16. Then, the data signal is output from the memory 4 to the data bus 13. Further, when a data signal is set at the data bus 13 and the write enable bus 17 is activated, the data is written to the memory device 4. Thus, one PC card can be used for memory function and for communication function at the same time.

Figure 4:
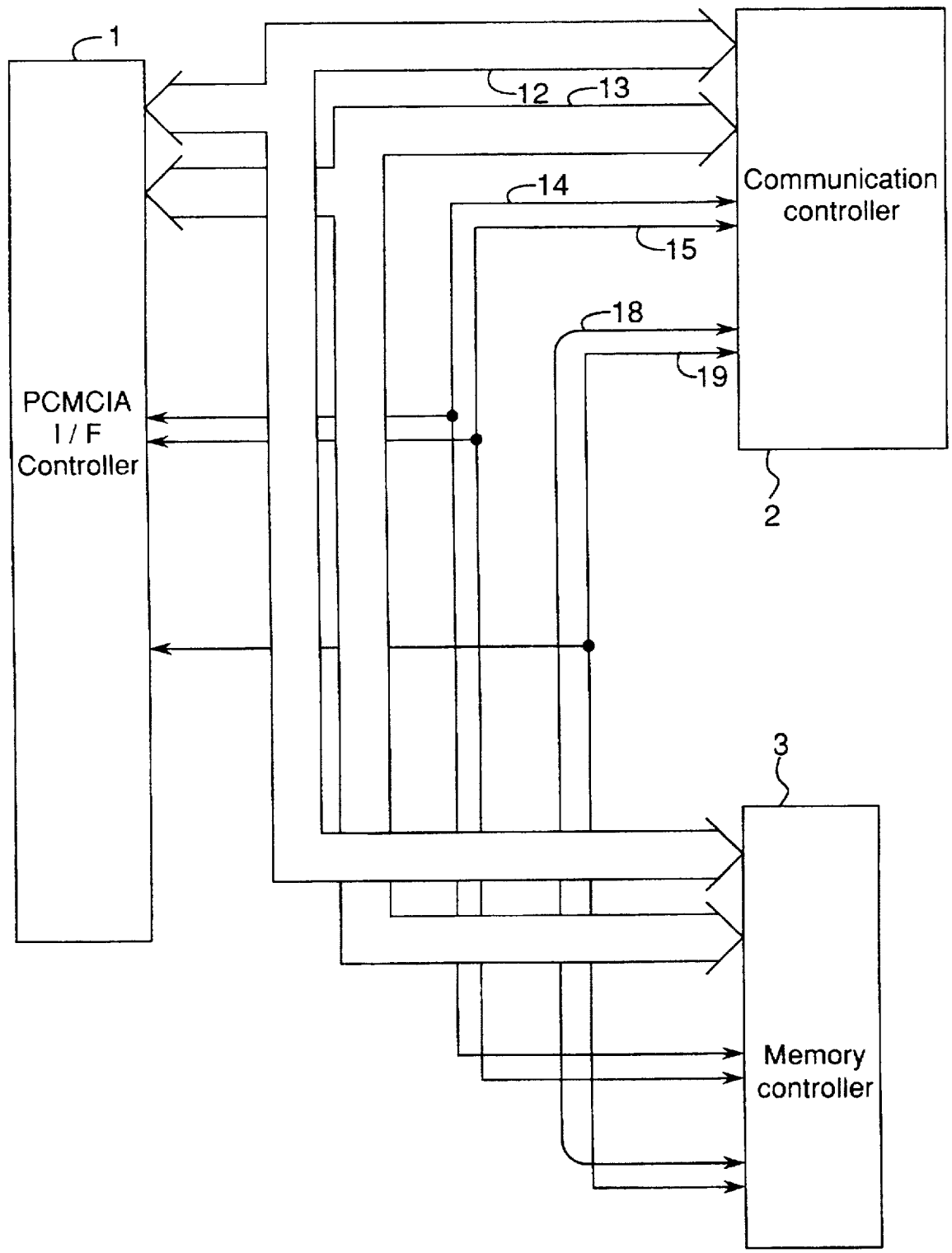
FIG. 4 is a diagram of the internal bus in a second mode of the PC card.

Next, the second mode of operation of the PC card is explained. In this mode, data is transferred through the internal bus 11 between the communication function and the memory function in the PC card. As shown in FIG. 4, the busses such as the address bus 12, the data bus 13, the I/O read bus 14, the I/O write bus 15, the device selection bus 18 and the ready/busy bus 19 are used in the internal bus 11 in this mode.

In the second mode, when the PC card is inserted in a system equipment such as a personal computer (not shown), the system equipment transmits a request of data transfer to the PC card. When data is transferred from the memory controller 3 to the communication controller 2, the PCMCIA interface controller 1 makes the communication controller 2 change the configuration to a master. Then, the communication controller 2 as a master activates the device selection signal bus 18 connected to the memory controller 3. That is, the communication controller 2 sends the device selection signal to the memory controller 3. Next, the communication controller 2 activates the I/O read bus 14 and sets an address signal at the address bus 12, to output a data signal from the memory device 4 to the data bus 13, and the communication controller 2 receives the data signal. Thus, the data is transferred from the memory 4 to the communication controller 2.

On the other hand, when data is transferred from the communication controller 2 to the memory controller 3, the PCMCIA interface controller 1 makes the communication controller 2 change the configuration to a master. Then, the communication controller 2 as a master activates the device selection signal bus 18 connected to the memory controller 3. Next, the communication controller 2 activates the I/O write bus 15 and sets an address signal at the address bus 12, to output a data signal from the communication controller 2 to the data bus 13, and the memory controller 3 receives the data signal. Thus, the data is transferred from the communication controller 2 to the memory device 4.

As explained above, in the second mode, the PCMCIA interface controller 1 is not used when data are transferred within the PC card, or the PC card can be operated independently of the system bus 11. Then, even when data is communicated through the external line 9, the system can perform another task.

Next, the third mode of operation of the PC card is explained. In this operation, the communication function and the memory function are used in a time-sharing manner by using the request signal and the request enable signal. When data is communicated through the external line 9, if the data transfer at the external line 9 is slow, the system is not operated efficiently. In order to solve this problem, in the third mode, when data is sent from a memory in the system equipment through the IC card to the external line 9, the PC card is used as a communication card or a memory card in a time-sharing manner. That is, data is communicated to be stored in or transferred from the buffer RAM 5 in the communication function, and while the communication controller 2 communicates the data with the buffer RAM 5, the PC card is used as a memory card.

Next, the operation in the third mode is explained. The system equipment first uses the PC card as a communication card to transfer data which can be stored in the buffer RAM 5. That is, when the PC card is inserted in the system equipment, the system equipment transmits a request of communication to the PC card. Then, the PCMCIA interface controller 1 of the PC card changes the configuration to a communication card, and it activates the device selection signal bus 18 connected to the communication controller 2. Next, according to instructions from the system equipment, the PCMCIA interface controller 1 sets an address signal at the address bus 12 and a data signal at the data bus 13, and it activates the I/O write bus 15. Then, the communication controller 2 stores data in the buffer RAM 5 according to instructions. Then, after the data is stored in the buffer RAM 5, the communication controller 2 sends the data in the buffer RAM 5 through the external line 9 for communication.

In a period when the communication controller 2 processes data transmission, the PCMCIA interface controller 1 is not used. In this period, reading from and writing to the memory 4 is performed through the internal bus 11, as explained below. First, the system equipment sends a request of memory access to the PC card. According to the request, the PCMCIA interface controller 1 changes the configuration to a memory card. Then, the system equipment activates the device selection signal bus 18 connected to the memory controller 3 through the PCMCIA interface controller 1. Next, according to instructions from the system equipment, the PCMCIA interface controller 1 sets an address signal at the address bus 12 and a data signal at the data bus 13 and activates the output enable bus 16. Then, the data signal is output from the memory 4 to the data bus 13. Further, when a data signal is set at the data bus 13, and the write enable bus 17 is activated, the data is written to the memory device 4.

When data transmission of the communication controller 2 is completed, the communication controller 2 activates a request signal bus 20 to the PCMCIA interface controller 1. Then, the system equipment stops access to the memory controller 3, and data transfer is started again from the memory in the system equipment, as explained above. Thus, one PC card is used in time sharing as a communication function and as a memory function.

When data is received through the external line 9, the PC card operates similarly. That is, while the PC card is used as a memory card, data is stored through the external line 9 in the buffer RAM 5. When the buffer RAM 5 has been filled with data, the communication controller 2 activates the request bus 20. Then, the system equipment changes the configuration of the PC card to a communication card to stop memory access and activates the request enable bus 21. Then, the communication controller 2 transfers the data to the memory in the system equipment. Then, after the data has been transferred, the system equipment changes the configuration of the PC card to a memory card again to start memory access. Thus, the memory device 4 in the PC card can be accessed, while data are transferred through the external line 9.

Next, a second embodiment of the invention is explained. In the first embodiment explained above, the common internal bus 11 is connected between devices provided in the PC card. However, if such common internal bus 11 is used, there is a case where data transfer is slow due to factors such as a difference in bus width of the communication controller 2 and the memory controller 3. In the second embodiment, a memory controller 103 is used inside a PCMCIA interface controller 101, while another bus 111b connected to the memory function is used only for memory access at a fast data transfer rate.

Figure 5:
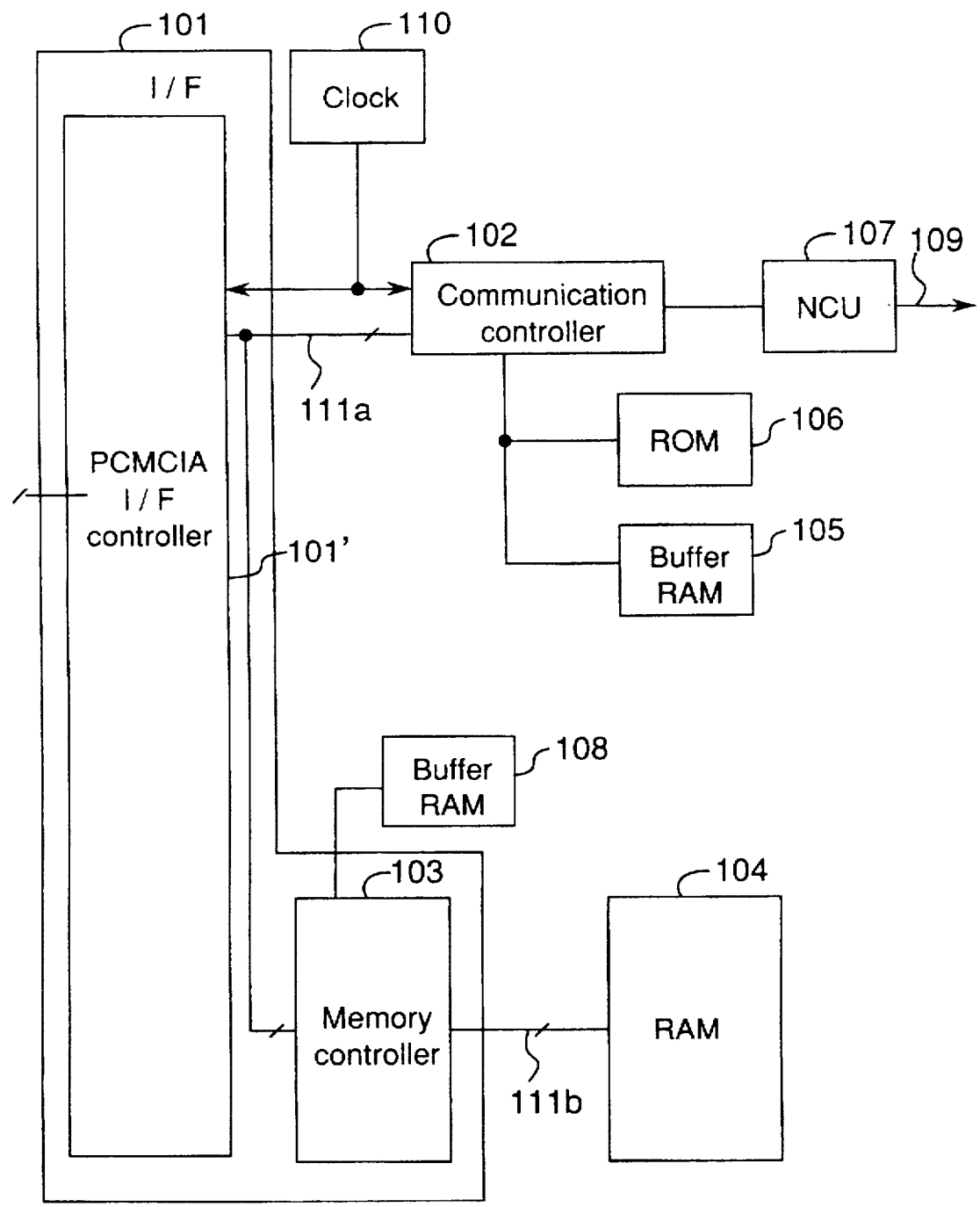
FIG. 5 is a block diagram of a PC card of a second embodiment of the present invention.

FIG. 5 shows a block diagram of the PC card of the second embodiment. In the PC card, bus widths of the address bus and the data bus are different among a plurality of functions. Then, a PCMCIA interface controller 101 includes an interface circuit 101' for input and output signals similar to the PCMCIA interface 1 shown in FIG. 1, while it further includes a memory controller 103 for controlling memory function in order to access a semiconductor memory device (RAM) 104. Further, internal buses 111a and 111b are provided for communication function and for memory function.

The PC card is explained further. In the PC card, the PCMCIA interface controller 101 to be connected to a system equipment such as a personal computer is connected through the internal bus 111a to a communication controller 102 controlling communication function. The communication controller 102 is connected to a buffer RAM 105 and a ROM 106 storing firmware of the communication controller 102, and it communicates with the external through a network control unit (NCU) 107 and a line 109. The memory controller 103 is connected through the internal bus 111b to the memory device (RAM) 104, and it controls read from and write to the memory 104 with use of a buffer RAM 108. A clock generator 110 supplies clock signals to the PCMCIA interface controller 101 and the communication controller 102.

Figure 6:
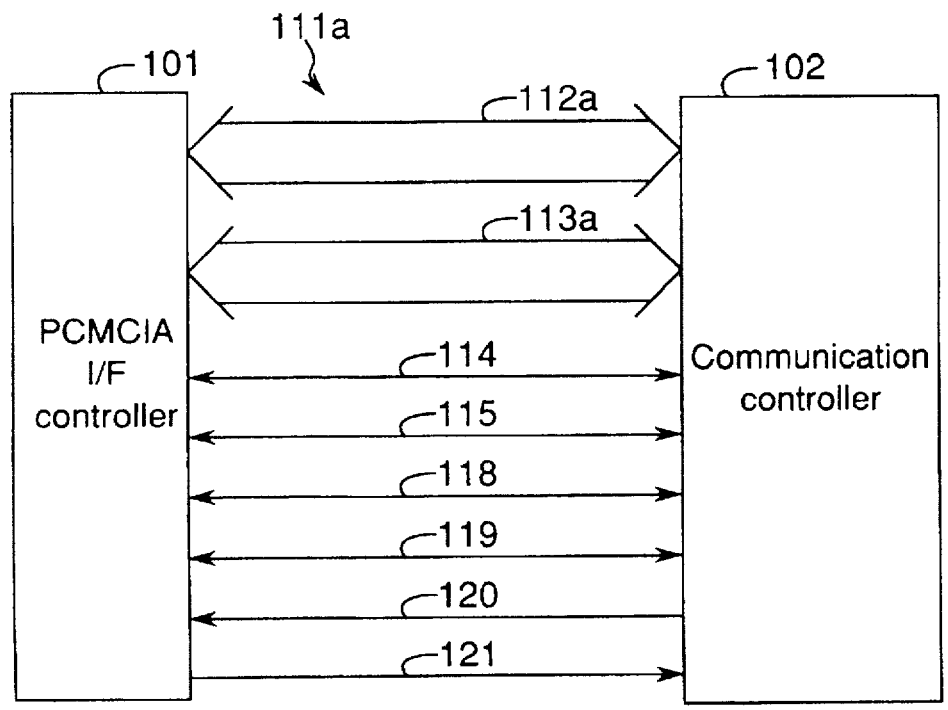
FIG. 6 is a diagram of a first internal bus of the PC card.
Figure 7:
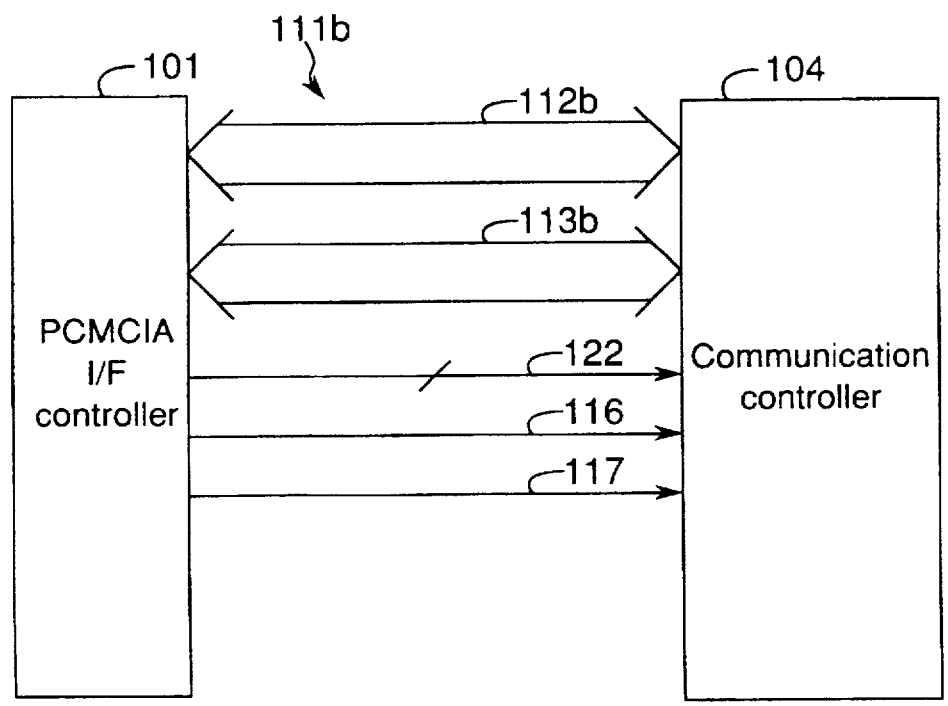
FIG. 7 is a diagram of a second internal bus of the PC card.

FIGS. 6 and 7 show the internal buses 111a and 111b of the PC card in detail. The internal bus 111a between the PCMCIA interface controller 101 and the communication controller 102 includes various buses such as an address bus 112a and a data bus 113a representing buses to transmit an address signal and a data signal, an I/O read bus 114 and an I/O write bus 115 representing busses to transmit an I/O read signal and an I/O write signal from the system equipment or the communication controller 102, an output enable bus 116 and a write enable bus 117 representing buses to transmit an output enable signal and a write enable signal from the system equipment or the communication controller 102, a device selection bus 118 representing a bus to transmit a device selection signal from the system equipment or the communication controller 102, a ready/busy bus 119 representing a bus to transmit a ready/busy signal to indicate if the system equipment or the communication controller 2 is ready or not, a request signal bus 120 representing a bus to transmit a request signal from the communication controller 102, and a request enabling signal bus 121 representing a bus to transmit a request enabling signal from the interface controller 101'.

On the other hand, the internal bus 111b between the PCMCIA interface controller 101 or the memory controller 103 and the memory 104 includes various buses such as an address bus 112b and a data bus 113b representing buses to transmit an address signal and a data signal, an output enable bus 116 and a write enable bus 117 representing buses to transmit an output enable signal and a write enable signal from the system equipment or the communication controller 102, and a selection bus 122 representing a bus to transmit a selection signal.

The internal buses 111a and 111b use the address buses 112a, 112b and the data buses 113a, 113b commonly in part, but bus widths of the address buses and the data buses are different among them. For example, the width of the data bus for the memory function is 16 bit, while that for the communication function is 8 bit. On the other hand, the other control signals are not common between them.

The PC card has the communication function and the memory function, and it performs the three modes of operation similar to those of the PC card of the first embodiment. In a situation where the PC card is used as a memory card, when the PC card is inserted in a system equipment, the system equipment transmits a request of communication to the PC card. Then, the PCMCIA interface controller 101 of the PC card changes the configuration to a communication card. Detailed explanation is omitted here because the operation is the same as that in the first embodiment. In a situation where the PC card is used as a memory card, when the PC card is inserted in a system equipment such as a personal computer, the system equipment transmits a request of memory access to the PC card. Then, the PCMCIA interface controller 101 of the PC card changes the configuration to a memory card and activates the memory controller 103. Next, according to instructions from the system equipment, the PCMCIA interface controller 101 sets an address signal at the address bus 112a, a data signal at the data bus 113a, and activates the output enable bus 116. Then, the data signal is output from the memory device 104 to the data bus 113b. Further, when a data signal is set at the data bus 113b, and the write enable bus 117 is activated, the data is written to the memory 104. Because the bus width for the memory function is wider, the memory device 104 can be accessed at a faster speed.

Next, the second mode of operation of the PC card is explained where data are transferred between the communication function and the memory function in the PC card. When the PC card is inserted in a system equipment, the system equipment transmits a request of data transfer to the PC card. When data is transferred from the memory controller 103 to the communication controller 102, the PCMCIA interface controller 101 makes the communication controller 102 change the configuration to a master. Then, the communication controller 102 as a master activates the device selection signal bus 118 connected to the memory controller 103 to activate it. Next, the communication controller 102 activates the I/O read bus 114 and sets an address signal at the address bus 112b, to output a data signal from the memory 104 to the data bus 113b, while the communication controller 102 receives the data signal. Thus, the data is transferred from the memory device 104.

On the other hand, when data is transferred from the communication controller 102 to the memory controller 103, the PCMCIA interface controller 101 makes the communication controller 102 change the configuration to a master. Then, the communication controller 102 as a master activates the device selection signal bus 118 connected to the memory controller 103. Next, the communication controller 102 activates the I/O write bus 115 and sets an address signal at the address bus 112a, to output a data signal from the communication controller 102 to the data bus 113a, while the memory controller 103 receives the data signal. Thus, the data is transferred to the memory device 104.

As explained above, in the second mode, the PCMCIA interface controller 101' is not used when data are transferred within the PC card, or the PC card can be operated independent of the system buses 111a, 111b. Then, even when data is communicated through the external line 109, the system can perform another task.

Next, the third mode of operation of the PC card is explained. In this operation, the communication function and the memory function are used in a time-sharing manner by using the request signal and the request enabling signal. When data are sent from a memory in the system equipment through the IC card to the external line 109, the PC card is used as a communication card or a memory card in a time-sharing manner. That is, while the communication controller 102 communicates data with the buffer RAM 105, the PC card is used as a memory card.

Next, the operation in the third mode is explained. The system equipment first uses the PC card as a communication card to transfer data which can be stored in the buffer RAM 105. That is, when the PC card is inserted in the system equipment, the system equipment transmits a request of communication to the PC card. Then, the PCMCIA interface controller 1 changes the configuration to a communication card. The operation as the communication card is similar to that in the first embodiment. In a period when the communication controller 102 processes data transmission, the PCMCIA interface controller 101 is not used. Then, in the period, read from or write to the memory 104 is performed through the wide internal bus at a fast speed.

When data transmission of the communication controller 102 is completed, the communication controller 102 activates a request signal bus 120 to the PCMCIA interface controller 101. Then, the system equipment stops access to the memory controller 103, and data transfer to the buffer RAM 105 is started again from the memory in the system equipment. Thus, one PC card is used in a time-sharing manner as a communication function and as a memory function. When data are received, the PC card operates similarly and it is not explained here.

Although the present invention has been fully described in connection with the preferred embodiments thereof with reference to the accompanying drawings, it is to be noted that various changes and modifications are apparent to those skilled in the art. Such changes and modifications are to be understood as included within the scope of the present invention as defined by the appended claims unless they depart therefrom.

What is claimed is:

1. A PC card comprising:
   a PCMCIA interface controller connected to external system equipment;
   a communication control section controlling communication through an external line;
   a memory device;
   a memory control section connected to said memory device and controlling writing to and reading from said memory device; and
   an internal bus including a data bus, an address bus and a control signal bus, said internal bus connecting said PCMCIA interface controller, said communication control section and said memory control section to each other;
   wherein said PCMCIA interface controller chances a configuration of said internal bus to permit said PC card to operate as a memory card or a communication card according to a command received from the external system equipment.

2. The PC card of claim 1, wherein said internal bus further includes a bus for transmitting a control signal from said PCMCIA interface controller for activating said communication control section or said memory control section.

3. The PC card of claim 1, wherein said internal bus further includes a bus for transmitting a control signal for selecting one of said communication control section and said memory control section as a master.

4. The PC card of claim 1, wherein said internal bus further includes a bus for transmitting a control signal for communicating completion of communication processing with the external equipment to said PCMCIA interface controller.

5. A PC card comprising:
   a memory device;
   a PCMCIA interface controller connected to external system equipment, said PCMCIA interface controller including a memory control section for controlling writing to and reading from said memory device;
   a communication control section controlling communication through an external line;
   a first internal bus including a first data bus, a first address bus and first control signal bus, said first internal bus connecting said PCMCIA interface controller to said communication control section; and
   a second internal bus including a second data bus, a second address bus and a second control signal bus, said second internal bus connecting a memory device in said PCMCIA interface controller to said memory devices;

wherein said PCMCIA interface controller changes a configuration of said internal bus to permit said PC card to operate as a memory card or a communication card according to a command received from the external system equipment.

6. The PC card of claim 5, wherein a width of the second data bus is greater than a width of the first data bus.

7. A method comprising the steps of:

rendering a memory section of the PC card inactive and instructing a communication section of the PC card to transmit data to and receive data from an external system, when receiving a communication operation instruction from a host system;

rendering the communication section of the PC card inactive and instructing the memory section of the PC card to operate as an IC memory card for reading data from and writing data to, when receiving a memory operation instruction from the host system in the PCMCIA controller of the PC card;

storing first data stored in the PC card to the external system and monitoring reading and transmission of the first data, when receiving a memory read instruction from the host system; and storing second data sent from the host system on the PC card and monitoring transmission and writing of the second data, when receiving a memory write instruction from the host system.

8. The method of claim 8, wherein the communication operation instruction, the memory operation instruction, the memory read instruction and the memory write instruction are received and processed by a PCMCIA interface controller on the PC card.

9. The method of claim 9, wherein the communication operation instruction, the memory operation instruction, the memory read instruction and the memory write instruction are routed in the PC card via an internal bus.

10. The method of claim 7, wherein the communication operation instruction activates the communication section of the PC card.

11. The method of claim 7, wherein the memory operation instructions activate the memory section of the PC card.

12. The method of claim 7, wherein the communication operation instruction selects the communication section of the PC card to act as a master.

13. The method of claim 7, wherein the communication operation instruction selects the memory section of the PC card to act as a master.

* * * * *